United States Patent [19]

Conaway et al.

[11] Patent Number: 4,675,540

[45] Date of Patent: Jun. 23, 1987

[54] TOGGLE ELECTRICAL SWITCH

[75] Inventors: Douglas E. Conaway, De Soto; Harold L. Trammell, Jr., Hurst, both of Tex.

[73] Assignee: Ranco Electronics Division, Irving, Tex.

[21] Appl. No.: 702,052

[22] Filed: Feb. 15, 1985

[51] Int. Cl.[4] ........................ H01H 15/10; H02B 1/24

[52] U.S. Cl. .................................. 307/115; 200/16 C

[58] Field of Search .................... 200/1 V, 1 R, 16 C, 200/16 D; 307/112, 115

[56] References Cited

U.S. PATENT DOCUMENTS

| | | | |
|---|---|---|---|
| 3,632,936 | 1/1972 | Piber | 200/1 V X |
| 3,737,601 | 6/1973 | Arthur et al. | 200/16 D X |
| 3,755,640 | 8/1973 | Kaman et al. | 200/1 V X |
| 4,095,072 | 6/1978 | Piber | 200/1 V X |
| 4,097,704 | 6/1978 | Piber | 200/1 V X |
| 4,100,383 | 7/1978 | Piber | 200/1 V X |
| 4,528,456 | 7/1985 | Harris | 307/115 X |

*Primary Examiner*—J. R. Scott

*Attorney, Agent, or Firm*—Hubbard, Thurman, Turner & Tucker

[57] ABSTRACT

An electrical switch including a toggle lever pivotally mounted to a switch housing with the toggle lever connected to a slide in a manner to provide longitudinal motion to the slide between a first and second end positions when the toggle lever is pivoted. The slide includes a first conductor, which when the slide is at the first end position, maintains contact with a first conductive track and, when the slide is at the second end position, provides an electrical conduction path between the first conductive track and a second node. When the slide is located between the first and second end positions, the first conductor provides an electrical conduction path between the first conductive track and a third node. The first conductor is also in contact with a second conductor within the slide and the second conductor is in sliding contact with a circuit contained upon a substrate which is further connected between the first and third conductive track and having an output connected to the second conductive track. The substrate is mounted upon the switch housing parallel to the longitudinal motion of the slide and perpendicular to the pivotal rotation of the toggle lever. By pivoting the toggle lever, the electrical output of the substrate circuit is altered.

4 Claims, 10 Drawing Figures

TOGGLE ELECTRICAL SWITCH

BACKGROUND

1. Field of the Invention

This invention relates generally to power control switches and specifically to power switches with variable control output.

2. Description of the Prior Art

Traditionally, light switches for household use have included a toggle switch mounted on a wall. The toggle switch includes an off position and on position and is located electrically between the power source and the power load, most commonly a light. In this circuit, the toggle switch serves to physically make or break contact to establish or break the circuit connection between the load and the power source. An alternative circuit configuration includes two toggle switches connected in series between the power source and the load. The type of toggle switch used in this configuration is normally referred to a "three wire" switch wherein there is a two wire parallel connection between the two toggle switches, with one toggle switch connected to a single line to the power source and a second toggle switch connected to the load. In this "three wire" configuration, either toggle switch may be used to make or break the power source connection to the load.

More recently, power switches that provide variable output to the load have been introduced. These switches include a disk shaped knob that is rotated to vary the power provided to the load. This disk shaped knob is connected to a potentiometer which is used to control the power from the source to the load either directly or through a second control circuit contained within the switching device.

It is, therefore, desirable to provide a traditionally appearing toggle switch that includes a switching function and a variable control function to regulate power to a load.

It is an object of the present invention to provide such a toggle switch that includes the switching function and variable control functions in a low profile configuration allowing for the installation of the toggle switch within a shallow wall structure. Additionally, a low profile facilitates installation in a conventional fashion.

SUMMARY OF THE INVENTION

In accordance with the present invention an electrical switch is provided that includes a toggle lever pivotally mounted to a switch housing and further connected to a slide in a manner to provide longitudinal motion to the slide between first and second end limit positions when the toggle lever is pivoted. The slide includes a first conductor which when the slide is located in the first end limit position maintains contact with a first conductive track and when the slide is located in the second end limit position provides an electrical conduction path between the first conductive track and a second conductive track. When the slide is located in a position between the first and second end limits, the conductor provides a second conduction path between the first conductive track and a third conductive track. The first conductor is further connected to a second conductor in the slide which is in sliding contact with a circuit contained upon a substrate and connected between the first and third conductive tracks. The substrate is mounted upon the switch housing parallel to the longitudinal motion of the slide and perpendicular to the pivotal rotation of the toggle lever to provide power from the first conductive track to the a load connected to the third conductive track at a level that varies with the longitudinal position of the second conductor upon the circuit.

In a preferred embodiment, the electrical switch includes the first conductive track connected to a power source with the second conductive track connected to the load wherein, in the first limit position the power source is isolated from the load and in the second limit position, the power source is directly connected to the load. In this embodiment, the second conductor contained within the slide is in slidable contact with a variable resistor contained upon the substrate circuit surface and whose resistance varies in accordance with the longitudinal position of the second conductor upon the resistor. In this embodiment, the variable resistor includes two strips upon the substrate with one strip being a conductive strip and a second strip being a resistive strip. The second conductor is in slideable contact with both strips and shorts the conductive strip to different portions of the resistive strip to provide the variable resistance function. Further in this embodiment, the circuit contains a regulation device connected between the first and third nodes for regulating power to a load connected to the third conductive track. In this embodiment, this regulation device is a triac that is formed upon the substrate surface. Further in this embodiment, the circuit includes a capacitor chargeable through the resistor and connected to a diac and then to the gate of the triac resulting in the triac regulating the power to the load in accordance with the charge upon the capacitor. Also in this embodiment, an inductor and a second capacitor are connected to the circuit to reduce electromagnetic interference caused by the switching of power.

In an alternative embodiment, an electrical switch is provided that includes a toggle lever pivotally mounted to a switch housing and further connected to a slide to provide longitudinal motion to the slide between the first and second end limit positions resulting from the pivoting of the toggle lever. The slide includes a first conductor which provides an electrical conduction path between a first conductive track and a conductive plate; when the slide is located in the second end limit position, the conductor provides an electrical conduction path between the first conductive track and a second conductive track; and when the slide is located between the first and second end limit positions, the conductor provides a conduction path between the first conductive track and a third conductive track. The first conductor is further connected to a second conductor in the slide with the second conductor being in sliding contact with a circuit contained upon a substrate and further connected between the first and third conductive tracks. The substrate is mounted in the switch housing parallel to the longitudinal motion of the slide and perpendicular to the pivotal rotation of the toggle lever. When the switch is in the first end limit position the switch connects the first conductive track to the conductive plate in a manner similar to a three wire toggle switch. When the switch is in the second end limit position the switch provides a connection between the first conductive track and second conductive track to provide an unregulated power connection between the first conductive track and second conductive track. The third conductive track, is as previously discussed, connected to the first conductive track through the circuit to variably regulate power to the load. When connected in the three wire switch configuration, the variable control switch, in a variable control position, will either provide power under the variable control state or provide an on/off switch function depending upon the location of the variable control switch in the circuit configuration and the specific switch setting of the second switch in the circuit.

BRIEF DESCRIPTION OF THE DRAWINGS

The novel features believed characteristic of the invention are set forth in the claims. The invention itself, however, as well as other features and advantages thereof will be best understood by reference to detail descriptions which follow when read in conjunction with the accompanying drawings, wherein:

DESCRIPTION OF THE PREFERRED EMBODIMENT

Figure 1:
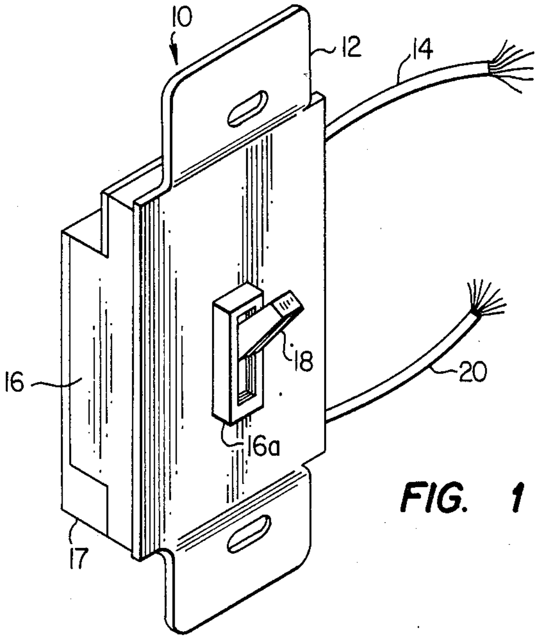
FIG. 1 is a perspective view of the electrical switch.

This invention relates to a toggle type electrical control switch of the type that is commonly used on walls of homes and apartments to control lights. FIG. 1 illustrates the invention in an assembled form. From the front the outward appearance of the invention is very similar to the standard toggle switch that is customarily used in the home. The invention, however, provides the additional feature of variable control. Additionally, FIG. 1 illustrates that the invention is of a low profile, i.e. of a shallower depth, than the traditional toggle switch for light control. This low profile and variable control function are a result of the unique structure of this invention. The invention consists of a wall plate 10 that includes the switch housing 16 mounted thereon. In the preferred embodiment, the wall plate 10 is metal and the switch housing 16 is plastic. Note that the switch housing includes an extended section 16A through the plate 10 for encompassing the toggle lever 18. In the preferred embodiment, the toggle lever 18 is mounted pivotally within the extension 16A. Since the housing is the only part of the switch structure in contact with the metal plate 10, all of the electronics contained within the housing 16 are electrically isolated from the metal plate 10. The switch invention further includes a back cover 17 also made of plastic, in the preferred embodiment, and two lead wires 14 and 20. A second embodiment of the invention will also be discussed that includes a three wire configuration. The three wire configuration switch is commonly used in applications involving two toggle switches placed in series wherein either toggle switch can control power to the light.

Figure 2A:
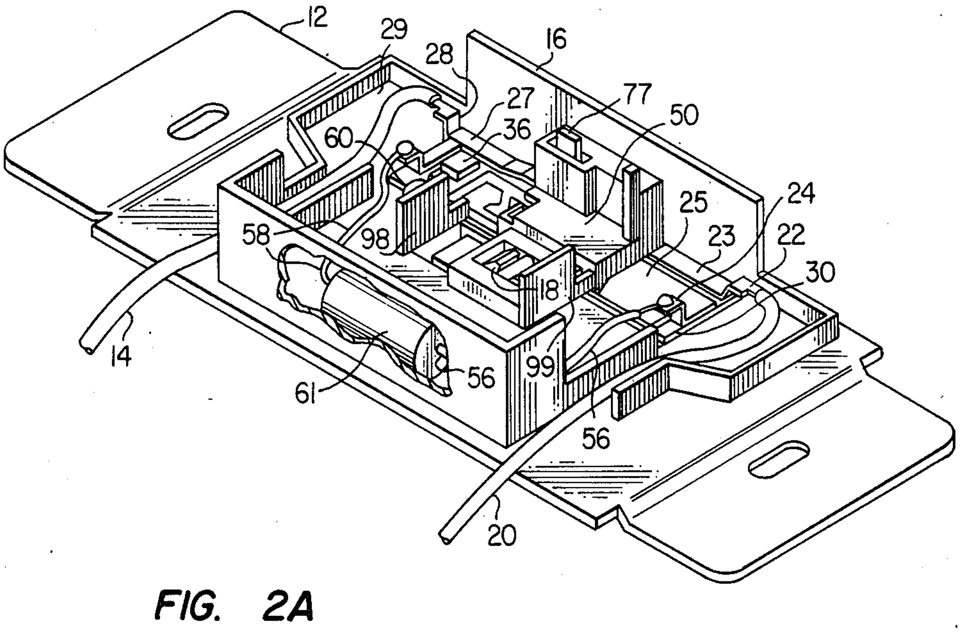
FIG. 2A is a rear elevation view of the electrical switch with the rear cover removed.

FIG. 2A illustrates the switch 10 with the back plate 17 removed. The two lead wires 14 and 20 are connected to terminals 28 and 22 respectively. Terminal 28 is contained on a conductive track 27 which is fixed to substrate 30. Terminal 22 is contained on a conductive track 23 which is also fixed to the same substrate 30. On top of substrate 30 is located at slide 50 that is connected to the toggle lever 18 as shown. The pivotal point for the toggle lever 18 is contained in the housing extension 16A of FIG. 1 as previously discussed but the toggle lever 18 extends through the housing 16A to engage the slide 50 as shown. The movement of toggle lever 18 about its pivotal axis results in the longitudinal movement of slide 50 across the surface of the substrate 30 between two end walls 98 and 99. Slide 50 includes a portion that is located above substrate 30. Therefore, the movement of the toggle lever 18 will cause the longitudinal movement of slide 50 on top of substrate 30 as shown.

Figure 3:
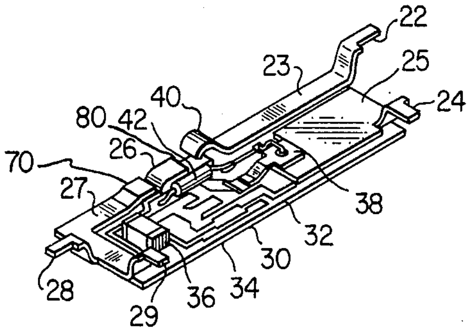
FIG. 3 is an exploded view of the switch substrate and contact components.

The substrate 30 is more clearly illustrated in FIG. 3. Referring to FIG. 3, conductive track 27 is shown to include terminals 28 and 29 and is located adjacent to 26. 23 is located adjacent to 26 and includes a portion 40 that extends above the substrate 30 forming a curved protrusion. Conductive track 26 includes a raised portion 80. Conductive track 23 also includes terminal 22 previously discussed. Conductive tracks 27, 26 and 23 are aligned to form a track upon which a conductive component within slide 50 (of FIG. 5A) travels. Substrate 30 (FIG. 3) further includes a capacitor 36, and a diac 42 located upon the substrate surface. Several resistive lines are further formed on the substrate 30 surface and include resistive lines 34 and 32. A triac 38 is formed upon the substrate 30 surface and is connected to a conductive plate 25 including terminal 24. Terminal 24 provides an external connection of the triac to external circuitry and plate 25 further serves as a thermal sink for triac 38. It should be understood that in assembly substrate 30 with conductive tracks 27, 26, 23 and 25 and conductive plate form a single component structure with a minimal height.

Figure 4A:
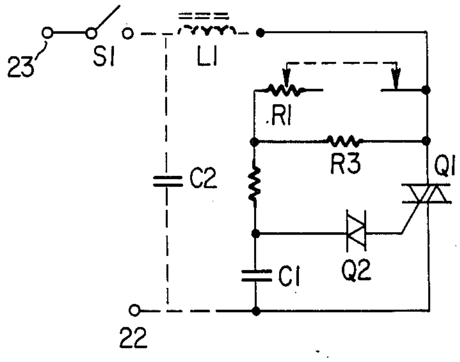
FIG. 4A is a schematic diagram of the electrical switch.

The circuit for the switch 10 is illustrated in FIG. 4A. Specifically, the solid lines represent the circuitry that is contained upon substrate 30. Resistor R1 is a variable resistor that includes resistive tracks 32 and 34 upon substrate 30. In operation, a wiper contained in slide 50 (of FIG. 2A) shorts resistive line 34 to resistive line 32 to form the resistor R1. Resistors R3 and R2 are also formed of a resistive material contained upon substrate 30. Capacitor C1, diac Q2 and triac Q1 are components 36, 42 and 38 of FIG. 3 as previously discussed. In addition to the circuitry contained upon the substrate, the switch 10 further includes an inductor L1 and the capacitor C2 that are connected externally to the substrate and are provided to reduce electromagnetic interference resulting from the power regulation. Additionally, S1 is shown in FIG. 4A and is the schematic equivalent of the operation of the slide 50 over the conductive tracks 23, 26 and 27 previously discussed.

Returning to FIG. 2A, the slide 50 contains two conductive devices. The first conductive device 74 (FIGS. 5A–5C) which travels along the conductive tracks 23, 26 and 27 is shown to include an upper portion or extension portion conductive tracks 77 that extends through the slide 50. In addition, FIG. 2A illustrates the capacitor C2 (of FIG. 4A) as capacitor 60 and inductor L1 (of FIG. 4A) as coil 61 that is connected to terminal 29 by wire 58 and terminal 24 by line 56.

Figure 4B:
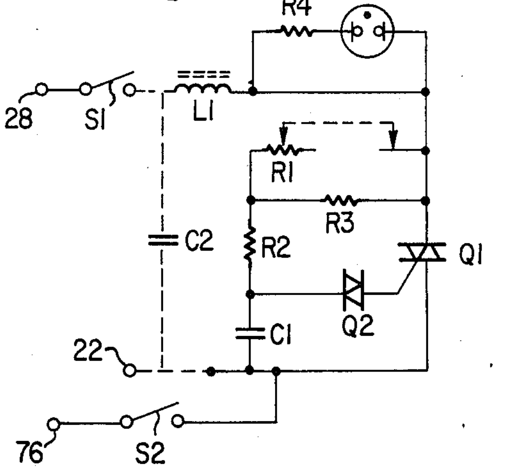
FIG. 4B is a schematic diagram of the three wire configured electrical switch.

The three wire configuration for switch 10 is illustrated in schematic form in FIG. 4B. FIG. 4B is identical to FIG. 4A except that it contains a switch S2 and terminal 76. In operation when S2 is closed, S1 will be closed, however, S1 may remain closed when S2 is open. This is made possible because of slide 50 and its internal conductor components. Therefore, when S2 is closed S1 will be closed and terminal 28 will be connected to terminal 76. When S2 is open and S1 is closed, terminal 28 will be connected through the circuitry previously discussed to terminal 22.

Figure 2B:
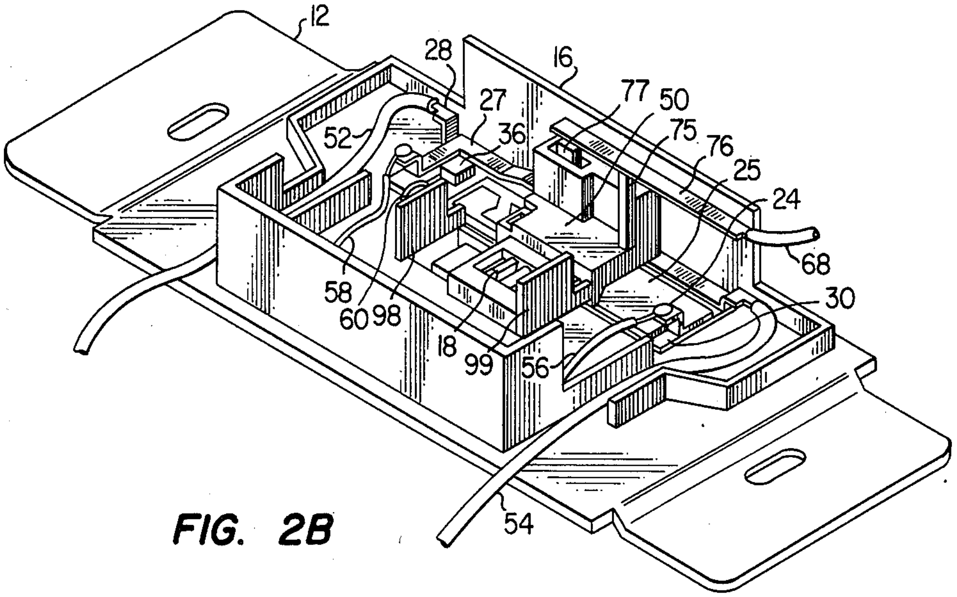
FIG. 2B is a rear elevation view of a second embodiment of the electrical switch for a three wire switch configuration.

The physical implementation of this three wire configuration is illustrated in FIG. 2B. The third wire terminal 76, which is a conductive plate type terminal, is connected to the third wire 68 as shown and is located above the slide 50. A plastic post 75 is contained upon slide 50 to keep the terminal strip 76 from making contact with the conductive extension 77 within slide 50. However, when the slide 50 is in the appropriate position, the extension 77 will extend through the slide 50 and make contact with the terminal 76 thus closing switch S2 of FIG. 4B.

Figure 2C:
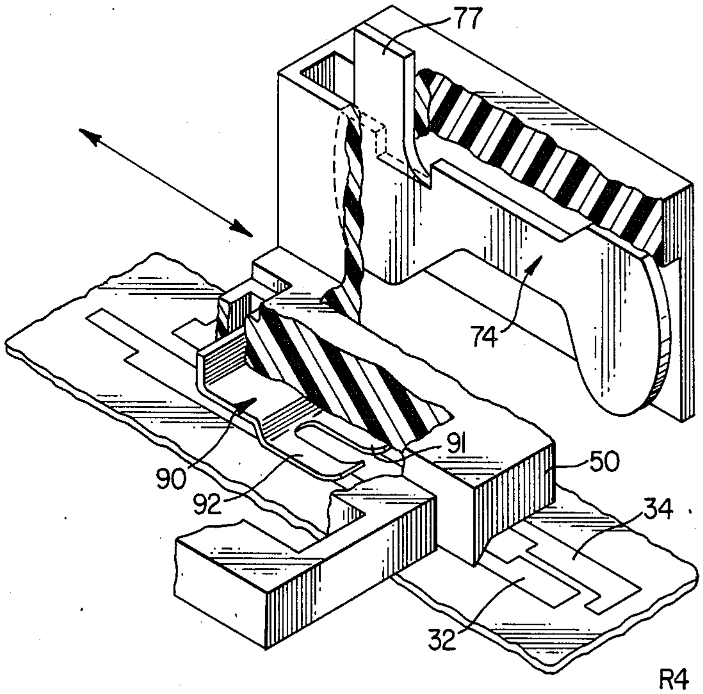
FIG. 2C is a rear elevation view of the electrical switch with a cutaway section illustrating the wiper underneath the gate.

This configuration is more clearly illustrated in FIG. 2C which contains two cutaways of slide 50 illustrating the wiper 90 including wiper fingers 91 and 92 that effectively short together with the two resistive lines 34 and 32 of substrate 30 previously discussed. In addition, the conductor 74 with extension 77 as shown is located in slide 50 with a spring (not shown). The spring is provided to maintain tension on conductor 74 to maintain contact with the conductive tracks 23, 26 and 27 discussed previously in FIG. 3.

Figure 5A:
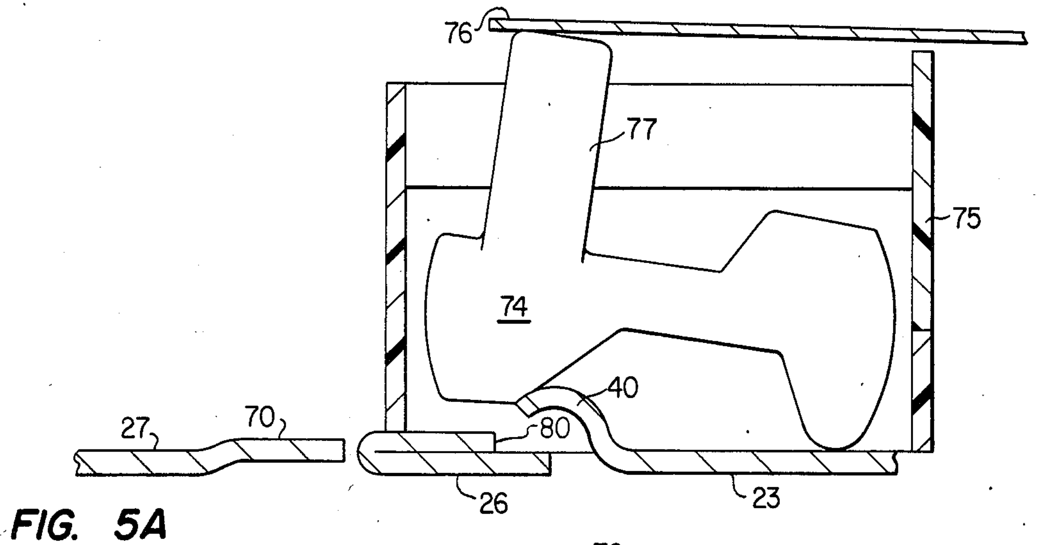
FIG. 5A is a front view diagram of the hammer conductor contained within the slide in the first limit position.
Figure 5B:
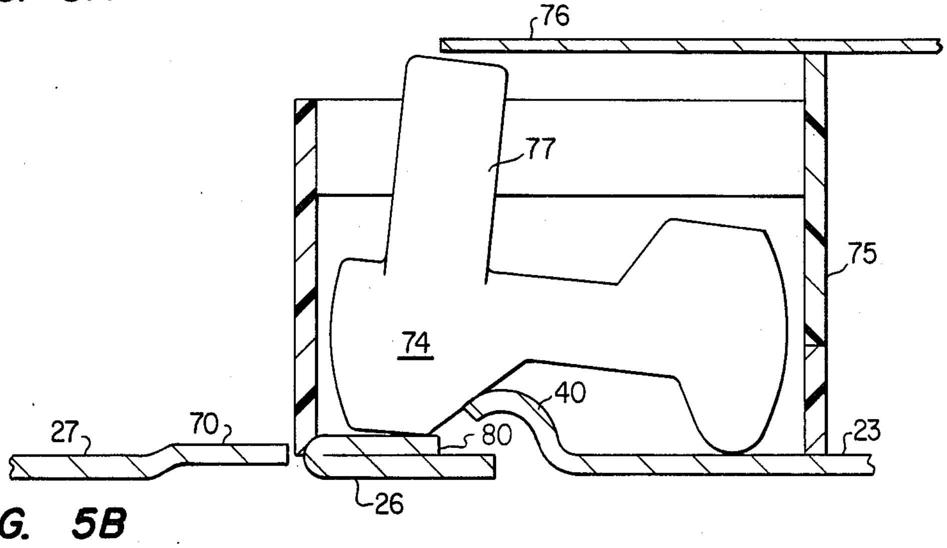
FIG. 5B is a side view of the hammer contained within the slide in a position between the first and second limit positions.
Figure 5C:
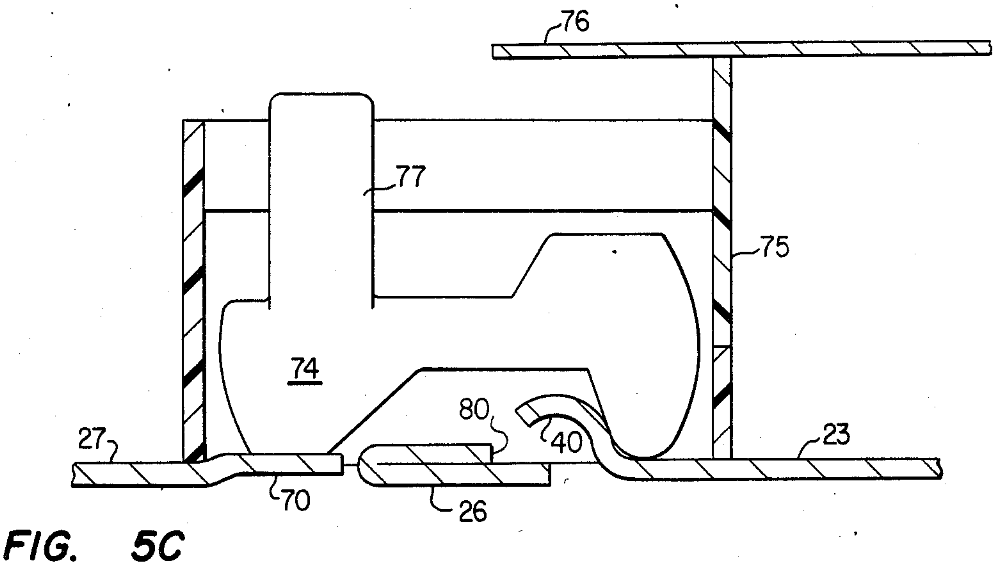
FIG. 5C is a side view of the slide hammer in the second limit position.

Referring to FIGS. 5A–5C, conductor 74 is shown in FIG. 5A in the first end position. In this position, conductor 74 is raised on the elevated portion 40 of conductive track 23 such that the extension 77 extends through the housing and is in contact with terminal 76. Therefore, conductor 74 is providing a conductive path between conductive track 23 and conductive terminal 76. Further, it should be noted that conductive track 26 and conductive track 27 are isolated electrically from track 23 and terminal 76. In the second position shown in FIG. 5B, conductor 74 has been longitudinally displaced such that it is in contact with conductive track 26. Note that post 75 is maintaining the position of strip 76 such that the extension 77 of the conductor 74 extension 77 is no longer in contact with terminal 76. In this position, conductor 74 provides in a conductive path between conductive track 26 and track 23. The third position is illustrated in FIG. 5C. In this figure conductor 74 has been longitudinally displaced such that it is in contact with an elevated portion 70 of track 27 while maintaining contact with track 23. Note that the elevated portion 40 of track 23 prevents the conductor 74 from making contact with track 26. Additionally, post 75 maintains the vertical spacing between strip 76 and the conductor 74 extension 77.

In operation, in the first position (FIG. 5A) switch S2 (FIG. 4B) is closed and switch S1 is closed connecting terminal 28 to terminal 76 as discussed. In a second position (FIG. 5B), track 23 which is connected to substrate 30 is electrically connected to plate 25 (FIG. 3) and resistive line 34 which is electrically shorted to resistive line 32 (FIG. 2C) to provide voltage to resistor R1 (FIG. 4B). The longitudinal displacement of the slide 50 will be such that conductor 74 maintains contact between tracks 26 and 23. However, the position of wiper 90 over tracks 34 and 32 does vary with the longitudinal position resulting in a variance of the resistive value of resistor R1. This resistive value along with the resistors R2, R3 and capacitor C1 govern the firing of triac Q1. Therefore, by varying the longitudinal location of slide 50, the regulation of triac Q1 can be controlled to, in turn, regulate the power transferred between terminal 28 (FIG. 3) and terminal 22. Inductor L1 and capacitor C2 are provided as an inductive capacitive filter to reduce electromagnetic interference caused by the switching and regulation of power within this unit.

In another embodiment, a neon light NE1 is provided in series with a resistor R4 as shown in FIG. 4B. This neon light is located behind toggle lever 18. In this embodiment, toggle lever 18 is fabricated of a translucent plastic and the neon light NE1 will generate light within the switch housing illuminating the toggle lever 18.

Although the invention has been described in detail in the embodiments within this specification, it is to be understood by those familiar with the art, that this invention may be embodied in other specific forms without departing from the spirit or scope of the invention as defined by the appended claims.

What is claimed is:

1. An improved toggle switch comprising:

(a) a housing having a wall plate, back plate and an extension through the wall plate;

(b) a toggle lever pivotally mounted in the housing extension;

(c) a compact component structure including a substrate, and first, second and third conductive tracks mounted upon said substrate, the first conductive track having a power source terminal and the third conductive track having a load terminal, a regulating means for regulating power from the first conductive track to a load connected to the third conductive track, and a plurality of resistive lines formed on the substrate between the first and third conductive tracks for providing a variable resistor, whereby a single component of minimal height is provided; and (d) a slide means operable connected to the toggle lever for longitudinal movement along the conductive tracks and the variable resistor forming conductive lines, the slide means including a housing and first and second conductive devices, the first conductive device comprising a variable resistor wiper for the pair of resistive lines and the second conductive device including an elongated conductor operatively connected to the first conductive device, and the second conductive device being movable with the slide housing for connecting the first conductive track selectively to the second conductive track for inputting a voltage to the variable resistor wiper and to the third conductive track for connecting the regulation means for power regulation, whereby a toggle switch for switching and variable control functions having a low profile is provided.

2. An improved toggle switch according to claim 1 further including a conductive plate having a power output terminal, support means for positioning the conductive plate above the slide housing, a conductive extension integral with the second conductive device, the extension operable in response to slide movement to connect the conductive plate to the first conductive track for connecting power to the conductive plate power output terminal whereby toggle switches can be interconnected.

3. An electrical switch according to claim 1 wherein said regulation means includes a triac.

4. An electrical switch according to claim 3 wherein said regulation means further includes a capacitor chargeable through said resistor and connected through a diac to a gate of the triac, said triac regulating power to the load in accordance with the charge upon said capacitor.

* * * * *